(12) United States Patent
Jenkins et al.

(10) Patent No.: US 11,997,439 B2
(45) Date of Patent: *May 28, 2024

(54) SYSTEMS AND METHODS FOR CRASH DETERMINATION

(71) Applicant: CALAMP CORP., Irvine, CA (US)

(72) Inventors: Jeff Jenkins, Irvine, CA (US); Greg Bayley, Irvine, CA (US); Peter Byrne, Fort Collins, CO (US); Gallin Chen, Irvine, CA (US)

(73) Assignee: CalAmp Corp., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/104,171

(22) Filed: Jan. 31, 2023

(65) Prior Publication Data
US 2023/0269504 A1   Aug. 24, 2023

Related U.S. Application Data

(63) Continuation of application No. 16/862,985, filed on Apr. 30, 2020, now Pat. No. 11,570,529, which is a
(Continued)

(51) Int. Cl.
*H04Q 9/00* (2006.01)
*B60R 21/013* (2006.01)
(Continued)

(52) U.S. Cl.
CPC ............ *H04Q 9/00* (2013.01); *B60R 21/013* (2013.01); *B60W 40/10* (2013.01); *G01P 15/0891* (2013.01); *G01S 19/17* (2013.01); *G01S 19/42* (2013.01); *G07C 5/085* (2013.01); *G08G 1/205* (2013.01); *B60R 2021/01322* (2013.01);
(Continued)

(58) Field of Classification Search
CPC ...................................................... H04Q 9/00
See application file for complete search history.

(56) References Cited

U.S. PATENT DOCUMENTS

| 4,497,025 A | 1/1985 | Hannoyer |
| 4,549,277 A | 10/1985 | Brunson et al. |

(Continued)

OTHER PUBLICATIONS

European Search Report in Related Patent Application EP 17824833.2-1215, dated Apr. 15, 2021, 7 pages.

*Primary Examiner* — Michael A Berns
(74) *Attorney, Agent, or Firm* — Barnes & Thornburg LLP

(57) ABSTRACT

Systems and methods for crash determination in accordance with embodiments of the invention are disclosed. In one embodiment, a vehicle telematics device includes a processor and a memory storing a crash determination application, wherein the processor, on reading the crash determination application, is directed to obtain sensor data from at least one sensor installed in a vehicle, calculate peak resultant data based on the sensor data, where the peak resultant data describes the acceleration of the vehicle over a first time period, generate crash score data based on the peak resultant data and a set of crash curve data for the vehicle, where the crash score data describes the likelihood that the vehicle was involved in a crash based on the characteristics of the vehicle and the sensor data, and provide the obtained sensor data when the crash score data exceeds a crash threshold to a remote server system.

20 Claims, 6 Drawing Sheets

Related U.S. Application Data continuation of application No. 16/106,453, filed on Aug. 21, 2018, now abandoned, which is a continuation of application No. 15/205,385, filed on Jul. 8, 2016, now Pat. No. 10,055,909.

(51) Int. Cl.
| | | |
|---|---|---|
| *B60W 40/10* | (2012.01) | |
| *G01P 15/08* | (2006.01) | |
| *G01S 19/17* | (2010.01) | |
| *G01S 19/42* | (2010.01) | |
| *G07C 5/08* | (2006.01) | |
| *G08G 1/00* | (2006.01) | |
| *B60R 21/0132* | (2006.01) | |
| *G07C 5/00* | (2006.01) | |

(52) U.S. Cl.
CPC ......... *G07C 5/008* (2013.01); *H04Q 2209/40* (2013.01); *H04Q 2209/86* (2013.01)

(56) References Cited

U.S. PATENT DOCUMENTS

| | | |
|---|---|---|
| 5,058,020 A | 10/1991 | Matsuda |
| 5,117,375 A | 5/1992 | Worcester et al. |
| 5,251,161 A | 10/1993 | Gioutsos et al. |
| 5,253,173 A | 10/1993 | Drobny et al. |
| 5,337,238 A | 8/1994 | Gioutsos et al. |
| 5,339,242 A | 8/1994 | Reid et al. |
| 5,377,108 A | 12/1994 | Nishio |
| 5,519,613 A | 5/1996 | Gioutsos et al. |
| 5,559,699 A | 9/1996 | Gioutsos |
| 5,563,791 A | 10/1996 | Gioutsos et al. |
| 5,587,906 A | 12/1996 | Mciver et al. |
| 5,588,005 A | 12/1996 | Ali et al. |
| 5,684,701 A | 11/1997 | Breed |
| 5,754,115 A | 5/1998 | Woo |
| 5,754,849 A | 5/1998 | Dyer et al. |
| 5,758,301 A | 5/1998 | Saito et al. |
| 5,767,766 A | 6/1998 | Kwun |
| 5,780,782 A | 7/1998 | O'Dea |
| 5,805,460 A | 9/1998 | Greene et al. |
| 5,825,283 A | 10/1998 | Camhi |
| 5,841,201 A | 11/1998 | Tabata et al. |
| 5,862,511 A | 1/1999 | Croyle et al. |
| 5,874,675 A | 2/1999 | Edmans et al. |
| 5,978,722 A | 11/1999 | Takasuka et al. |
| 6,029,111 A | 2/2000 | Croyle |
| 6,076,028 A | 6/2000 | Donnelly et al. |
| 6,085,151 A | 7/2000 | Farmer et al. |
| 6,163,690 A | 12/2000 | Lilja |
| 6,236,921 B1 | 5/2001 | Mcconnell |
| 6,269,290 B1 | 7/2001 | Egami et al. |
| 6,308,134 B1 | 10/2001 | Croyle et al. |
| 6,337,653 B1 | 1/2002 | Bchler et al. |
| 6,346,876 B1 | 2/2002 | Flick |
| 6,356,841 B1 | 3/2002 | Hamrick et al. |
| 6,363,308 B1 | 3/2002 | Caruso et al. |
| 6,392,527 B1 | 5/2002 | Gilano et al. |
| 6,401,027 B1 | 6/2002 | Xu et al. |
| 6,417,802 B1 | 7/2002 | Diesel |
| 6,431,593 B1 | 8/2002 | Cooper et al. |
| 6,438,475 B1 | 8/2002 | Gioutsos et al. |
| 6,532,419 B1 | 3/2003 | Begin et al. |
| 6,540,255 B1 | 4/2003 | Blank et al. |
| 6,611,755 B1 | 8/2003 | Coffee et al. |
| 6,737,989 B2 | 5/2004 | Flick |
| 6,756,885 B1 | 6/2004 | Flick |
| 6,812,888 B2 | 11/2004 | Drury et al. |
| 6,832,140 B2 | 12/2004 | Fan et al. |
| 6,850,839 B1 | 2/2005 | Mcgibney |
| 6,912,557 B1 | 6/2005 | North et al. |
| 7,015,830 B2 | 3/2006 | Flick |
| 7,020,501 B1 | 3/2006 | Elliott et al. |
| 7,050,897 B2 | 5/2006 | Breed et al. |
| 7,085,637 B2 | 8/2006 | Breed et al. |
| 7,110,880 B2 | 9/2006 | Breed et al. |
| 7,158,016 B2 | 1/2007 | Cuddihy et al. |
| 7,250,850 B2 | 7/2007 | Mizutani |
| 7,272,493 B1 | 9/2007 | Hamrick et al. |
| 7,286,929 B2 | 10/2007 | Staton et al. |
| 7,348,895 B2 | 3/2008 | Lagassey |
| 7,366,608 B2 | 4/2008 | Hamrick et al. |
| 7,460,954 B2 | 12/2008 | Hamrick et al. |
| 7,484,756 B2 | 2/2009 | Le et al. |
| 7,527,288 B2 | 5/2009 | Breed |
| 7,577,525 B2 | 8/2009 | Hamrick et al. |
| 7,607,510 B1 | 10/2009 | Mun |
| 7,643,919 B2 | 1/2010 | Nicaise |
| 7,660,652 B2 | 2/2010 | Smith et al. |
| 7,671,727 B2 | 3/2010 | Flick |
| 7,725,218 B2 | 5/2010 | Hamrick et al. |
| 7,765,039 B1 | 7/2010 | Hagenbuch |
| 7,767,766 B2 | 8/2010 | Tilbrook |
| 7,805,231 B2 | 9/2010 | Cluff et al. |
| 7,805,276 B1 | 9/2010 | Byers et al. |
| 8,004,397 B2 | 8/2011 | Forrest et al. |
| 8,010,251 B2 | 8/2011 | Hamrick et al. |
| 8,032,278 B2 | 10/2011 | Flick |
| 8,065,342 B1 | 11/2011 | Borg et al. |
| 8,155,841 B2 | 4/2012 | Erb |
| 8,330,626 B1 | 12/2012 | Adelson |
| 8,489,271 B2 | 7/2013 | Hergesheimer et al. |
| 8,635,091 B2 | 1/2014 | Amigo et al. |
| 8,688,380 B2 | 4/2014 | Cawse et al. |
| 8,749,350 B2 | 6/2014 | Geisler et al. |
| 8,762,009 B2 | 6/2014 | Ehrman et al. |
| 8,799,034 B1 | 8/2014 | Brandmaier et al. |
| 8,812,173 B2 | 8/2014 | Chen et al. |
| 8,855,143 B1 | 10/2014 | Acampora |
| 8,874,279 B2 | 10/2014 | Frye et al. |
| 8,893,114 B1 | 11/2014 | Cooley |
| 8,996,240 B2 | 3/2015 | Plante |
| 9,002,538 B2 | 4/2015 | Hergesheimer et al. |
| 9,171,460 B2 | 10/2015 | Chen et al. |
| 9,179,497 B1 | 11/2015 | Mcconnell et al. |
| 9,217,757 B2 | 12/2015 | Hergesheimer et al. |
| 9,392,431 B2 * | 7/2016 | Barfield, Jr. ........... G07C 5/008 |
| 9,406,222 B2 | 8/2016 | Hergesheimer et al. |
| 9,457,754 B1 | 10/2016 | Christensen et al. |
| 9,459,277 B2 | 10/2016 | Hergesheimer et al. |
| 9,491,420 B2 | 11/2016 | Mimar |
| 9,644,977 B2 * | 5/2017 | Camisa ................... G01S 19/13 |
| 9,648,579 B2 | 5/2017 | Abhishek |
| 9,650,007 B1 | 5/2017 | Snyder et al. |
| 10,055,909 B2 * | 8/2018 | Jenkins ................... G01S 19/17 |
| 10,102,689 B2 | 10/2018 | Hergesheimer et al. |
| 10,107,831 B2 | 10/2018 | Hergesheimer et al. |
| 10,171,478 B2 * | 1/2019 | McCauley ............ H04L 9/3247 |
| 10,214,166 B2 * | 2/2019 | Dlagnekov ......... B60R 16/0232 |
| 10,219,117 B2 * | 2/2019 | Hergesheimer ......... H04W 4/48 |
| 10,395,438 B2 * | 8/2019 | Jenkins ................. B60R 21/013 |
| 10,466,269 B2 | 11/2019 | Hergesheimer et al. |
| 10,473,750 B2 * | 11/2019 | Hergesheimer ...... G01S 5/02521 |
| 10,599,421 B2 * | 3/2020 | Cook .................... G06F 9/4401 |
| 10,606,605 B2 * | 3/2020 | Arora ........................ G06F 8/65 |
| 11,206,171 B2 * | 12/2021 | Zywicki ................. G07C 5/008 |
| 11,472,361 B2 * | 10/2022 | Jenkins ............... B60R 16/0234 |
| 11,570,529 B2 * | 1/2023 | Jenkins ............... G01P 15/0891 |
| 2002/0013648 A1 | 1/2002 | Feser et al. |
| 2002/0065045 A1 | 5/2002 | Kim |
| 2002/0100310 A1 | 8/2002 | Begin |
| 2002/0124166 A1 | 9/2002 | Lee et al. |
| 2002/0135167 A1 | 9/2002 | Mattes et al. |
| 2002/0188940 A1 | 12/2002 | Breckner et al. |
| 2003/0001368 A1 | 1/2003 | Breed et al. |
| 2003/0005117 A1 | 1/2003 | Kang et al. |
| 2003/0028766 A1 | 2/2003 | Gass et al. |
| 2003/0121027 A1 | 6/2003 | Hines |
| 2003/0151507 A1 | 8/2003 | Andre et al. |
| 2003/0176959 A1 | 9/2003 | Breed |
| 2003/0236970 A1 | 12/2003 | Palmer et al. |
| 2004/0036261 A1 | 2/2004 | Breed |

(56) References Cited

U.S. PATENT DOCUMENTS

| | | |
|---|---|---|
| 2004/0075539 A1 | 4/2004 | Savoie et al. |
| 2004/0088090 A1 | 5/2004 | Wee |
| 2004/0132500 A1 | 7/2004 | Rogalski et al. |
| 2004/0142659 A1 | 7/2004 | Oesterling |
| 2004/0155790 A1 | 8/2004 | Tsuji |
| 2004/0171378 A1 | 9/2004 | Rautila |
| 2004/0257208 A1 | 12/2004 | Huang et al. |
| 2005/0065711 A1 | 3/2005 | Dahlgren et al. |
| 2005/0071314 A1 | 3/2005 | Caron |
| 2005/0099289 A1 | 5/2005 | Arita et al. |
| 2005/0240343 A1 | 10/2005 | Schmidt et al. |
| 2005/0267947 A1 | 12/2005 | Patrick et al. |
| 2005/0273516 A1 | 12/2005 | Patrick et al. |
| 2005/0283286 A1 | 12/2005 | Kanda et al. |
| 2006/0022469 A1 | 2/2006 | Syed et al. |
| 2006/0031432 A1 | 2/2006 | Patrick et al. |
| 2006/0034237 A1 | 2/2006 | Patrick et al. |
| 2006/0041336 A1 | 2/2006 | Schubert et al. |
| 2006/0047459 A1 | 3/2006 | Underbrink et al. |
| 2006/0050953 A1 | 3/2006 | Farmer et al. |
| 2006/0074621 A1 | 4/2006 | Rachman |
| 2006/0199537 A1 | 9/2006 | Eisenbach |
| 2007/0027612 A1 | 2/2007 | Barfoot et al. |
| 2007/0038653 A1 | 2/2007 | Li et al. |
| 2007/0109117 A1 | 5/2007 | Heitzmann et al. |
| 2007/0229251 A1 | 10/2007 | Ehrman et al. |
| 2007/0257791 A1 | 11/2007 | Arita et al. |
| 2007/0266078 A1 | 11/2007 | Rittle et al. |
| 2007/0271014 A1 | 11/2007 | Breed |
| 2007/0299587 A1 | 12/2007 | Breed et al. |
| 2008/0043821 A1 | 2/2008 | Brockhage et al. |
| 2008/0111666 A1 | 5/2008 | Plante et al. |
| 2008/0114545 A1 | 5/2008 | Takaoka et al. |
| 2008/0128600 A1 | 6/2008 | Ogisu et al. |
| 2008/0150707 A1 | 6/2008 | Shamoto |
| 2008/0195261 A1 | 8/2008 | Breed |
| 2008/0202199 A1 | 8/2008 | Finley et al. |
| 2008/0211666 A1 | 9/2008 | Saidi et al. |
| 2008/0211914 A1 | 9/2008 | Herrera et al. |
| 2008/0275601 A1 | 11/2008 | Saito et al. |
| 2008/0281618 A1 | 11/2008 | Mermet et al. |
| 2009/0015392 A1 | 1/2009 | Takahashi et al. |
| 2009/0037056 A1 | 2/2009 | Erb |
| 2009/0077229 A1 | 3/2009 | Ebbs |
| 2009/0177350 A1 | 7/2009 | Williams et al. |
| 2009/0217163 A1 | 8/2009 | Jaroker |
| 2009/0217733 A1 | 9/2009 | Stachow et al. |
| 2009/0221320 A1 | 9/2009 | Walley et al. |
| 2009/0249858 A1 | 10/2009 | Ishikawa et al. |
| 2010/0039216 A1 | 2/2010 | Knight et al. |
| 2010/0039247 A1 | 2/2010 | Ziegler et al. |
| 2010/0039318 A1 | 2/2010 | Kmiecik et al. |
| 2010/0042286 A1 | 2/2010 | Lich |
| 2010/0097316 A1 | 4/2010 | Shaw et al. |
| 2010/0122246 A1 | 5/2010 | Gesquiere et al. |
| 2010/0185524 A1 | 7/2010 | Watkins et al. |
| 2010/0205427 A1 | 8/2010 | Bauer et al. |
| 2010/0231002 A1 | 9/2010 | Yoshioka et al. |
| 2010/0235433 A1 | 9/2010 | Ansari et al. |
| 2010/0241838 A1 | 9/2010 | Cohen et al. |
| 2010/0273422 A1 | 10/2010 | Garrett et al. |
| 2010/0279647 A1 | 11/2010 | Jacobs et al. |
| 2010/0312473 A1 | 12/2010 | Hoshizaki |
| 2010/0318257 A1 | 12/2010 | Kalinadhabhotla |
| 2011/0004444 A1 | 1/2011 | Farrow et al. |
| 2011/0029726 A1 | 2/2011 | Fujimoto |
| 2011/0053575 A1 | 3/2011 | Veliu et al. |
| 2011/0060496 A1 | 3/2011 | Nielsen et al. |
| 2011/0071971 A1 | 3/2011 | Parks et al. |
| 2011/0106373 A1 | 5/2011 | Hergesheimer et al. |
| 2011/0109438 A1 | 5/2011 | Dijkstra et al. |
| 2011/0130906 A1 | 6/2011 | Mayer |
| 2011/0153367 A1 | 6/2011 | Amigo et al. |
| 2011/0202225 A1 | 8/2011 | Willis et al. |
| 2011/0202305 A1 | 8/2011 | Willis et al. |
| 2011/0218710 A1 | 9/2011 | Trinh et al. |
| 2011/0238289 A1 | 9/2011 | Lehmann et al. |
| 2011/0264393 A1 | 10/2011 | An et al. |
| 2011/0307205 A1 | 12/2011 | Vassilieff |
| 2011/0320088 A1 | 12/2011 | Eom et al. |
| 2012/0022780 A1 | 1/2012 | Kulik et al. |
| 2012/0035881 A1 | 2/2012 | Rubin et al. |
| 2012/0041618 A1 | 2/2012 | Sun et al. |
| 2012/0050095 A1 | 3/2012 | Scherzinger et al. |
| 2012/0072078 A1 | 3/2012 | Oosaki |
| 2012/0116669 A1 | 5/2012 | Lee et al. |
| 2012/0146766 A1 | 6/2012 | Geisler et al. |
| 2012/0155389 A1 | 6/2012 | Mcnamee et al. |
| 2012/0158211 A1 | 6/2012 | Chen et al. |
| 2012/0159142 A1 | 6/2012 | Jibbe et al. |
| 2012/0231821 A1 | 9/2012 | Swanson |
| 2012/0233237 A1 | 9/2012 | Roa et al. |
| 2012/0233668 A1 | 9/2012 | Klker et al. |
| 2012/0253551 A1 | 10/2012 | Halimi et al. |
| 2012/0253585 A1 | 10/2012 | Harvie |
| 2012/0253892 A1 | 10/2012 | Davidson |
| 2012/0259526 A1 | 10/2012 | Inoue et al. |
| 2012/0303203 A1 | 11/2012 | Olsen et al. |
| 2012/0331181 A1 | 12/2012 | Govande et al. |
| 2013/0002415 A1 | 1/2013 | Walli et al. |
| 2013/0013907 A1 | 1/2013 | Marino et al. |
| 2013/0024202 A1 | 1/2013 | Harris et al. |
| 2013/0030811 A1 | 1/2013 | Olleon et al. |
| 2013/0038439 A1 | 2/2013 | Saito |
| 2013/0073142 A1 | 3/2013 | Hergesheimer et al. |
| 2013/0095841 A1 | 4/2013 | Quimby et al. |
| 2013/0148554 A1 | 6/2013 | Chen |
| 2013/0182693 A1 | 7/2013 | Sperling et al. |
| 2013/0204572 A1 | 8/2013 | Sato |
| 2013/0244210 A1 | 9/2013 | Nath et al. |
| 2013/0249713 A1 | 9/2013 | Adelson |
| 2013/0275001 A1 | 10/2013 | Hergesheimer et al. |
| 2013/0288659 A1 | 10/2013 | Hrabak et al. |
| 2013/0297137 A1 | 11/2013 | Fushiki et al. |
| 2013/0302756 A1 | 11/2013 | Takeuchi et al. |
| 2013/0320654 A1 | 12/2013 | Clark et al. |
| 2013/0338855 A1 | 12/2013 | Mason et al. |
| 2014/0069837 A1 | 3/2014 | Naruishi et al. |
| 2014/0074315 A1 | 3/2014 | Frye et al. |
| 2014/0074353 A1 | 3/2014 | Lee et al. |
| 2014/0075197 A1 | 3/2014 | Alrabady et al. |
| 2014/0094210 A1 | 4/2014 | Gellens et al. |
| 2014/0095211 A1 | 4/2014 | Gloerstad et al. |
| 2014/0111354 A1 | 4/2014 | Hergesheimer et al. |
| 2014/0118132 A1 | 5/2014 | Braunberger et al. |
| 2014/0142886 A1 | 5/2014 | Hergesheimer et al. |
| 2014/0143940 A1 | 5/2014 | Iuliano et al. |
| 2014/0149145 A1 | 5/2014 | Peng et al. |
| 2014/0173581 A1 | 6/2014 | Grinberg et al. |
| 2014/0180529 A1 | 6/2014 | Simon |
| 2014/0189335 A1 | 7/2014 | Liu et al. |
| 2014/0236518 A1 | 8/2014 | Hergesheimer et al. |
| 2014/0236519 A1 | 8/2014 | Hergesheimer et al. |
| 2014/0237463 A1 | 8/2014 | Sriram et al. |
| 2014/0300739 A1 | 10/2014 | Mimar |
| 2014/0303836 A1 | 10/2014 | Phelan |
| 2014/0309843 A1 | 10/2014 | Chen et al. |
| 2014/0357295 A1 | 12/2014 | Skomra et al. |
| 2014/0358394 A1 | 12/2014 | Picciotti |
| 2014/0379208 A1 | 12/2014 | Mcquade et al. |
| 2015/0015385 A1 | 1/2015 | Tomita et al. |
| 2015/0051796 A1 | 2/2015 | Levy |
| 2015/0105099 A1 | 4/2015 | Luo et al. |
| 2015/0149218 A1 | 5/2015 | Bayley et al. |
| 2015/0161391 A1 | 6/2015 | Johnsen et al. |
| 2015/0248731 A1 | 9/2015 | Fernandes et al. |
| 2015/0268059 A1 | 9/2015 | Borghesani |
| 2015/0271271 A1 | 9/2015 | Bullotta et al. |
| 2015/0271299 A1 | 9/2015 | Bullotta et al. |
| 2015/0339241 A1 | 11/2015 | Warner et al. |
| 2016/0094964 A1 | 3/2016 | Barfield, Jr. et al. |
| 2016/0104123 A1 | 4/2016 | Viswanath et al. |
| 2016/0133130 A1 | 5/2016 | Grimm et al. |
| 2016/0146615 A1 | 5/2016 | Abhishek |

(56) References Cited

U.S. PATENT DOCUMENTS

| | | |
|---|---|---|
| 2016/0147523 A1 | 5/2016 | Stauffer et al. |
| 2016/0162284 A1 | 6/2016 | Meng et al. |
| 2016/0173281 A1 | 6/2016 | White et al. |
| 2016/0328228 A1 | 11/2016 | Baptist et al. |
| 2016/0335813 A1 | 11/2016 | Hergesheimer et al. |
| 2016/0341559 A1 | 11/2016 | Camisa |
| 2016/0362075 A1 | 12/2016 | Dlagnekov |
| 2016/0364230 A1 | 12/2016 | Moeller et al. |
| 2017/0017766 A1 | 1/2017 | Giraud |
| 2017/0023610 A1 | 1/2017 | Hergesheimer et al. |
| 2017/0075835 A1 | 3/2017 | Langer |
| 2017/0147331 A1 | 5/2017 | Liem et al. |
| 2017/0220404 A1 | 8/2017 | Polar Seminario |
| 2017/0236339 A1 | 8/2017 | Camisa |
| 2017/0242678 A1 | 8/2017 | Sangameswaran et al. |
| 2017/0277530 A1 | 9/2017 | Adams et al. |
| 2017/0308705 A1 | 10/2017 | Karaginides et al. |
| 2018/0012429 A1 | 1/2018 | Jenkins et al. |
| 2018/0053354 A1 | 2/2018 | Jenkins et al. |
| 2018/0088963 A1 | 3/2018 | Arora et al. |
| 2018/0103355 A1 | 4/2018 | Hergesheimer et al. |
| 2018/0145991 A1 | 5/2018 | Mccauley et al. |
| 2018/0164401 A1 | 6/2018 | Hergesheimer |
| 2019/0018669 A1 | 1/2019 | Cook et al. |
| 2019/0140886 A1 | 5/2019 | Zywicki et al. |
| 2019/0141156 A1 | 5/2019 | Srinivasulu |
| 2019/0184918 A1 | 6/2019 | Dlagnekov |
| 2019/0281428 A1 | 9/2019 | Hergesheimer et al. |

\* cited by examiner

SYSTEMS AND METHODS FOR CRASH DETERMINATION

CROSS-REFERENCE TO RELATED APPLICATIONS

The present application is a continuation of, and claims priority to, U.S. patent application Ser. No. 16/862,985, entitled "Systems and Methods for Crash Determination, to Jenkins et al., filed Apr. 30, 2020, which is a continuation of U.S. patent application Ser. No. 16/106,453, entitled "Systems and Methods for Crash Determination" to Jenkins et al., filed Aug. 21, 2018, which is a continuation of U.S. patent application Ser. No. 15/205,385, entitled "Systems and Methods for Crash Determination" to Jenkins et al., filed Jul. 8, 2016 and issued on Aug. 21, 2018 as U.S. Pat. No. 10,055,909, the disclosures of which are incorporated herein by reference in their entireties

FIELD OF THE DISCLOSURE

The present invention relates to determining vehicle operational status and more specifically to determining when a vehicle has been involved in an accident.

BACKGROUND

A Global Positioning System (GPS) is a space-based global navigation satellite system that utilizes a network of geo-synchronous satellites that can be utilized by a GPS receiver to determine its location. Many telematics systems incorporate a Global Positioning System (GPS) receiver that can be used to obtain the location of a vehicle at a certain measured time. Using the signals received by the GPS receiver, the heading information of the vehicle can be determined. A GPS receiver can determine velocity information in a variety of ways including, but not limited to, measuring the Doppler shift of the received signals and by comparing the location of a vehicle at a plurality of measured times. The acceleration of the vehicle can be determined as the change in speed divided by the time between the measurements. A GPS receiver's ability to determine acceleration can be limited due to the dependence of the measurement upon factors such as, but not limited to, reception and satellite availability. In addition to location information, a GPS receiver can also be configured to provide time data. However, measurements determined via a GPS receiver can contain errors that affect the accuracy of the measured information. In particular, GPS signals are vulnerable to signal delays, inconsistencies of atmospheric conditions that affect the speed of the GPS signals as they pass through the Earth's atmosphere, and multipath distortions. Additionally, other factors not listed above can influence GPS signals and result in measurement errors.

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY

Systems and methods for crash determination in accordance with embodiments of the invention are disclosed. In one embodiment, a vehicle telematics device includes a processor and a memory connected to the processor and storing a crash determination application, wherein the processor, on reading the crash determination application, is directed to obtain sensor data from at least one sensor installed in a vehicle, calculate peak resultant data based on the sensor data, where the peak resultant data describes the acceleration of the vehicle over a first time period, generate crash score data based on the peak resultant data and a set of crash curve data for the vehicle, where the crash score data describes the likelihood that the vehicle was involved in a crash based on the characteristics of the vehicle and the sensor data, and provide the obtained sensor data when the crash score data exceeds a crash threshold to a remote server system.

In another embodiment of the invention, the at least one sensor includes an accelerometer.

In an additional embodiment of the invention, the crash curve data is based on vehicle data including a vehicle identification number associated with the vehicle.

In yet another additional embodiment of the invention, the crash curve data is dynamically determined based on vehicle data describing a weight of the vehicle.

In still another additional embodiment of the invention, the at least one sensor includes a weight sensor.

In yet still another additional embodiment of the invention, the vehicle telematics system further includes a communications interface and the vehicle telematics unit obtains the sensor data using the communications interface.

In yet another embodiment of the invention, the set of crash curve data is provided by the remote server system.

In still another embodiment of the invention, the remote server system includes a processor and a memory storing a crash analysis application and the processor of the remote server system, on reading the crash analysis application, is directed to obtain vehicle sensor data from the vehicle telematics device, obtain vehicle identification data from the vehicle telematics device, calculate resultant change data based on the obtained sensor data and the vehicle identification data, and generate crash occurred data when the resultant change data exceeds a threshold value.

In yet still another embodiment of the invention, the processor of the remote server system is further directed to provide notification data including the crash occurred data.

In yet another additional embodiment of the invention, the crash score data is generated by calculating peak resultant data based on the obtained sensor data and calculating the crash score data based on a duration of time in which the peak resultant data exceeds the crash curve data.

Still another embodiment of the invention includes a method for determining when a vehicle has been involved in a crash by obtaining sensor data from at least one sensor installed in a vehicle using a vehicle telematics device, where the vehicle telematics device includes a processor and a memory, calculating peak resultant data based on the sensor data using the vehicle telematics device, where the peak resultant data describes the acceleration of the vehicle over a first time period, generating crash score data based on the peak resultant data and a set of crash curve data for the vehicle using the vehicle telematics device, where the crash score data describes the likelihood that the vehicle was involved in a crash based on the characteristics of the vehicle and the sensor data, and providing the obtained sensor data when the crash score data exceeds a crash threshold to a remote server system using the vehicle telematics device.

In yet another additional embodiment of the invention, the at least one sensor includes an accelerometer.

In still another additional embodiment of the invention, the crash curve data is based on vehicle data including a vehicle identification number associated with the vehicle.

In yet still another additional embodiment of the invention, the crash curve data is dynamically determined based on vehicle data describing a weight of the vehicle.

In yet another embodiment of the invention, the at least one sensor includes a weight sensor.

In still another embodiment of the invention, the vehicle telematics system further includes a communications interface and the vehicle telematics unit obtains the sensor data using the communications interface.

In yet still another embodiment of the invention, the set of crash curve data is provided by the remote server system.

In yet another additional embodiment of the invention, the method further includes obtaining vehicle sensor data from the vehicle telematics device using a remote server system including a processor and a memory, obtaining vehicle identification data from the vehicle telematics device using the remote server system, calculating resultant change data based on the obtained sensor data and the vehicle identification data using the remote server system, and generating crash occurred data when the resultant change data exceeds a threshold value using the remote server system.

In still another additional embodiment of the invention, the method further includes providing notification data including the crash occurred data using the remote server system.

In yet still another additional embodiment of the invention, the crash score data is generated by calculating peak resultant data based on the obtained sensor data using the vehicle telematics device and calculating the crash score data based on a duration of time in which the peak resultant data exceeds the crash curve data using the vehicle telematics device.

DETAILED DESCRIPTION

Figure 1:
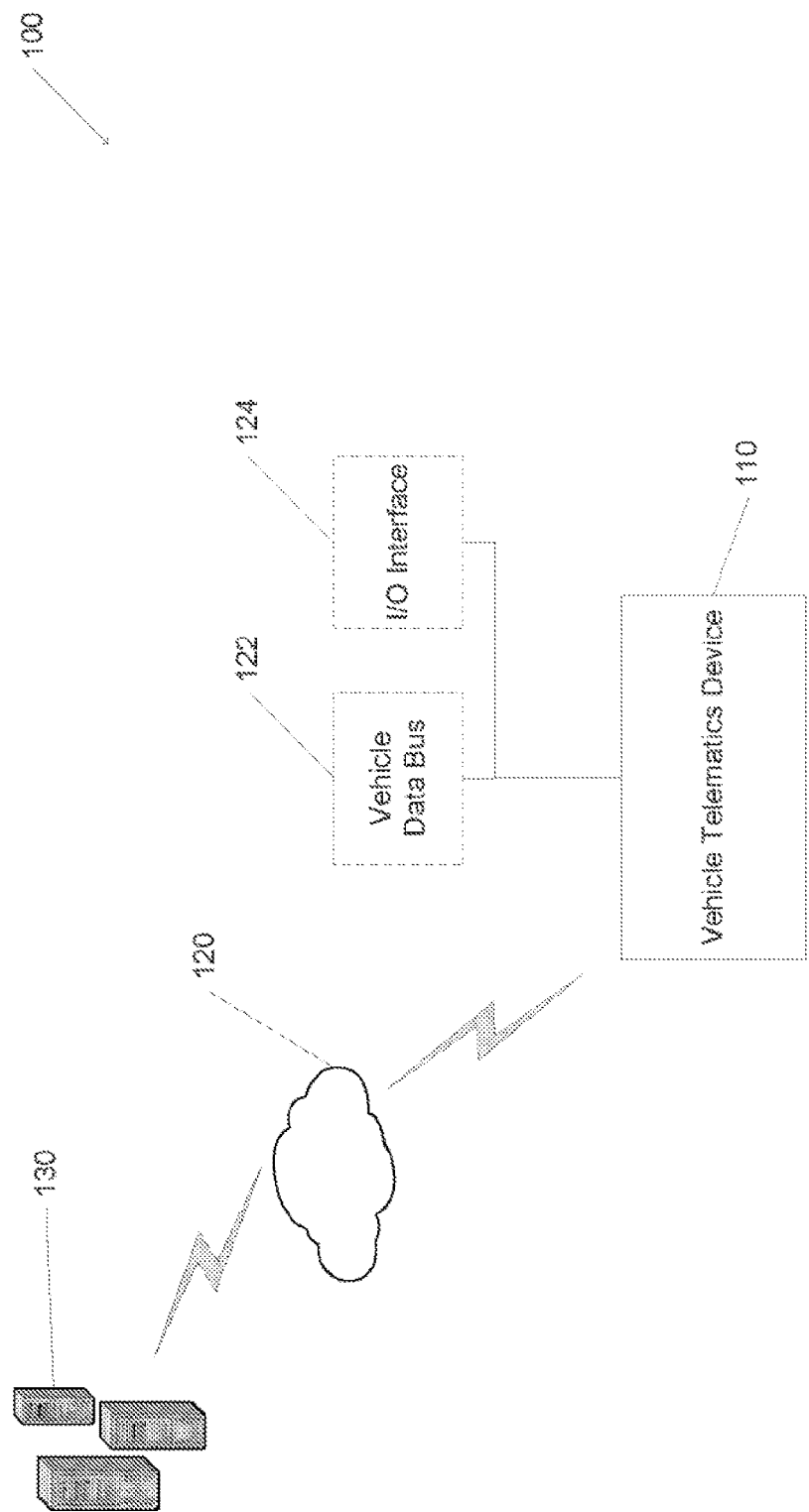
FIG. 1 is a conceptual illustration of a crash determination system in accordance with an embodiment of the invention.

Turning now to the drawings, systems and methods for determining when a vehicle has been involved in a crash in accordance with embodiments of the invention are disclosed. Many vehicles are equipped with a variety of safety systems, such as airbags and other crash-related protections. These safety systems activate when a variety of sensors installed in the car sense that a crash has occurred, thereby causing the safety system (i.e. the airbags) to deploy. The safety systems are single-vehicle devices specifically calibrated and designed for the specific make and model of vehicle in which they are installed. Each vehicle has different characteristics, such as weight and sensor installation location, which can strongly affect the sensor information that would indicate a crash and each of the safety systems are extensively tested, by both the vehicle manufacturer and the federal government, to determine the proper operation for firing the airbag. Due to the need to quickly deploy the airbags in the event of a crash, these safety systems need to determine if crash has occurred in 2-3 milliseconds as the airbags are deployed within 10-50 milliseconds of the sensors determining a crash. However, the safety systems do not record information about what was occurring at the time of the crash and, especially due to the speed required to deploy the airbag or other safety system, do not have sufficient time to analyze the information generated before and/or during the crash.

Crash determination systems in accordance with embodiments of the invention are capable of capturing data describing the operation of the vehicle before, during, and after a potential crash event. The crash determination systems can also analyze the captured data to determine if a crash has occurred. This type of analysis cannot routinely be performed using the safety systems in the vehicle as the crash has ended by the time crash detection has occurred and the computational and memory capabilities of the integrated safety systems can be a limiting factor. The post-crash analysis performed using a vehicle telematics system can discriminate between impacts (minor bumps, potholes, etc. . . . ) and actual crash events. Crash determination systems can perform a crash analysis in a variety of ways, including comparing a pre-set value against acceleration readings and by comparing the magnitude of the acceleration event against crash curve data, as appropriate to the requirements of specific embodiments of the invention. Many safety systems installed in vehicles utilize a crash curve to determine if a crash has occurred. However, these existing systems are limited in that the crash curve must be pre-set for the specific vehicle in which the safety system is installed and is highly dependent on the location in which the safety sensors are installed as described above.

Crash determination systems include vehicle telematics devices that are installed in a vehicle aftermarket. The vehicle telematics devices can be installed in a variety of locations depending on the make, model, and/or year of the vehicle and the specific installation location can vary between cars of the same make, model, and/or year. In many instances, vehicle telematics devices are installed in a location in a vehicle where data obtained from sensors installed in the vehicle, such as the airbag sensors, and/or data from a diagnostic connector for an onboard vehicle data bus, is unavailable to the vehicle telematics device. In this way, the crash determination devices provide a universal system for analyzing crash events. In several embodiments, the vehicle telematics device automatically determines crash curve data for the specific vehicle in which it is installed. Crash determination systems can also employ a two-stage analysis of the crash data. As is described in more detail below, a vehicle telematics device can obtain data during operation of the vehicle and/or perform a first stage analysis to determine if it is likely that a crash has occurred. The data can also be transmitted to a remote server system for a more detailed analysis. In this way, crash determination systems can differentiate between crash and non-crash events and provide a variety of data to dynamically determine crash curve data across many classes of vehicles.

In a variety of embodiments, the operational state of a vehicle is utilized in determining if a crash has occurred. That is, many crash determination systems in accordance with embodiments of the invention analyze crashes that occur while a vehicle is in operation, not while parked. In a number of embodiments, vehicle ignition state (i.e. the operational status of the vehicle) is ascertained by monitoring the vehicle for signs indicative of the vehicle ignition state without directly connecting to the vehicle ignition line. Information indicative of vehicle ignition state (i.e. vehicle status data) can be ascertained by observing characteristics of the vehicle including but not limited to the power supplied by the vehicle, vehicle vibration, communications on an OBD II or other vehicle data bus line, and/or vehicle position information. In many embodiments, multiple different types of information are combined to ascertain the vehicle ignition state. Systems and methods for using a vehicle telematics device added to the vehicle after the manufacture of the vehicle without a direct connection to the vehicle ignition line that can be utilized to determine ignition state information in accordance with embodiments of the invention are described in U.S. Pat. No. 8,489,271, titled "Systems and Methods for Virtual Ignition Detection" and issued Jul. 16, 2013, the disclosure of which is hereby incorporated by reference in its entirety.

In accordance with many embodiments of the invention, vehicle telematics devices are equipped with one or more sensors capable of determining the speed and/or acceleration of the vehicle. Vehicle speed can be calculated using information provided by a Global Position System (GPS) receiver by dividing the distance traveled by the GPS receiver by the time between measurements taken by the GPS receiver. In several embodiments, the GPS receiver is configured to determine velocity information using the signals received by the GPS receiver. A GPS receiver can determine velocity information in a variety of ways in accordance with embodiments of the invention, including, but not limited to, measuring the Doppler shift of the received signals. The differences in vehicle speed between measurements taken by the GPS receiver can be used to determine acceleration data for the vehicle. GPS receivers are also capable of determining the location of a vehicle and/or the heading of the vehicle utilizing the received signals. A variety of devices other than GPS receivers can be utilized in vehicles to determine information related to the vehicle, such as speed, acceleration, and heading. For example, acceleration information for a vehicle can be measured using an accelerometer, which are often installed on a vehicle or mobile device. Heading information can be determined using a compass. Vibration information can be determined using acceleration information taken using an acceleration sensor. In several embodiments, vehicle telematics systems are calibrated to accurately determine speed and/or acceleration data. Systems and methods for calibrating a 3-axis accelerometer which can be utilized to determine vibration information in accordance with a variety of embodiments of the invention is disclosed in U.S. Pat. No. 9,217,757, titled "Systems and Methods for 3-Axis Accelerometer Calibration" and issued Dec. 22, 2015, the entirety of which is hereby incorporated by reference.

The data captured by a vehicle telematics device can also be utilized to accurately determine the location at which a crash occurred. In a number of embodiments, the determination of the ignition status of a vehicle and/or the start of a trip can be utilized in a variety of ways, such as determining particular events that occur during the operation of the vehicle. Systems and methods for determining the location of events that can be utilized in accordance with embodiments of the invention are described in U.S. Patent Publication No. 2014/0111354, titled "Systems and Methods for Location Reporting of Detected Events in Vehicle Operation" and published Apr. 24, 2014, the disclosure of which is hereby incorporated by reference in its entirety.

Crash Determination Systems

Crash determination systems in accordance with embodiments of the invention can obtain a variety of data describing the status of a vehicle and determine when the vehicle has been involved in a crash. A conceptual diagram of a crash determination system in accordance with an embodiment of the invention is shown in FIG. 1. The crash determination system 100 includes a vehicle telematics device 110 that can communicate with a remote server system 130, a vehicle data bus 122, and/or an input/output (I/O) interface 124 as appropriate to the requirements of specific applications of embodiments of the invention. In a variety of embodiments, the vehicle telematics device 110 communicates with the remote server system 130 via a network 120. In a variety of embodiments, the network 120 is the Internet. In many embodiments, the network 120 is any wired or wireless network, such as a cellular network, between the vehicle telematics device 110 and the remote server system 130. In a number of embodiments, the remote server system 130 implemented using a single server system. In several embodiments, the remote server system 130 is implemented using multiple server systems.

In a variety of embodiments, the vehicle telematics device 110 is installed in a vehicle having a vehicle data bus 122. The vehicle telematics device 110 can obtain data from any of a variety of vehicle devices connected to the vehicle data bus 122 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety.

The vehicle telematics device 110 can include any of a variety of sensors and/or devices, including those described above with respect to the vehicle data bus and those described in more detail below, to obtain data regarding the status of the vehicle. This data can be utilized in a variety of crash determination processes to determine if the vehicle has been involved in a crash as described in more detail below. The vehicle telematics device 110 can also communicate with any of a variety of sensors and/or devices using the I/O interface 124. The I/O interface 124 can be any connection, including wired and wireless connections, as appropriate to the requirements of specific applications of embodiments of the invention. In several embodiments, the vehicle telematics device 110 is capable of executing scripts to read data and/or perform particular processes. These scripts can be pre-loaded on the device and/or obtained from the remote server system 130, vehicle data bus 122, and/or the I/O interface 124 as appropriate to the requirements of specific applications of embodiments of the invention. The vehicle telematics device 110 can be self-powered and/or connected into the electrical system of the vehicle in which the vehicle telematics device 110 is installed. In a variety of embodiments, the vehicle telematics device is powered via the vehicle data bus 122 and/or the I/O interface 124. In many embodiments, the vehicle telematics device 110 utilizes a Global Positioning System (GPS) receiver in order to determine the location, speed, and/or acceleration of the vehicle. However, it should be noted that any location-determining techniques, such as cellular tower triangulation, wireless network geolocation techniques, and dead reckoning techniques, could be utilized as appropriate to the requirements of specific applications of embodiments of the invention.

In a variety of embodiments, the vehicle telematics device 110 and/or remote server system 130 provides a user interface allowing for visualizing and interacting with the data. In several embodiments, the vehicle telematics device 110 and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a crash determination system in accordance with embodiments of the invention are discussed above and illustrated in FIG. 1, a variety of architectures, including sensors and other devices and techniques not specifically described above, can be utilized in accordance with embodiments of the invention. Furthermore, the processes described herein can be performed using any combination the vehicle telematics devices and/or the remote server systems as appropriate to the requirements of specific applications of embodiments of the invention.

Vehicle Telematics Devices

Figure 2A:
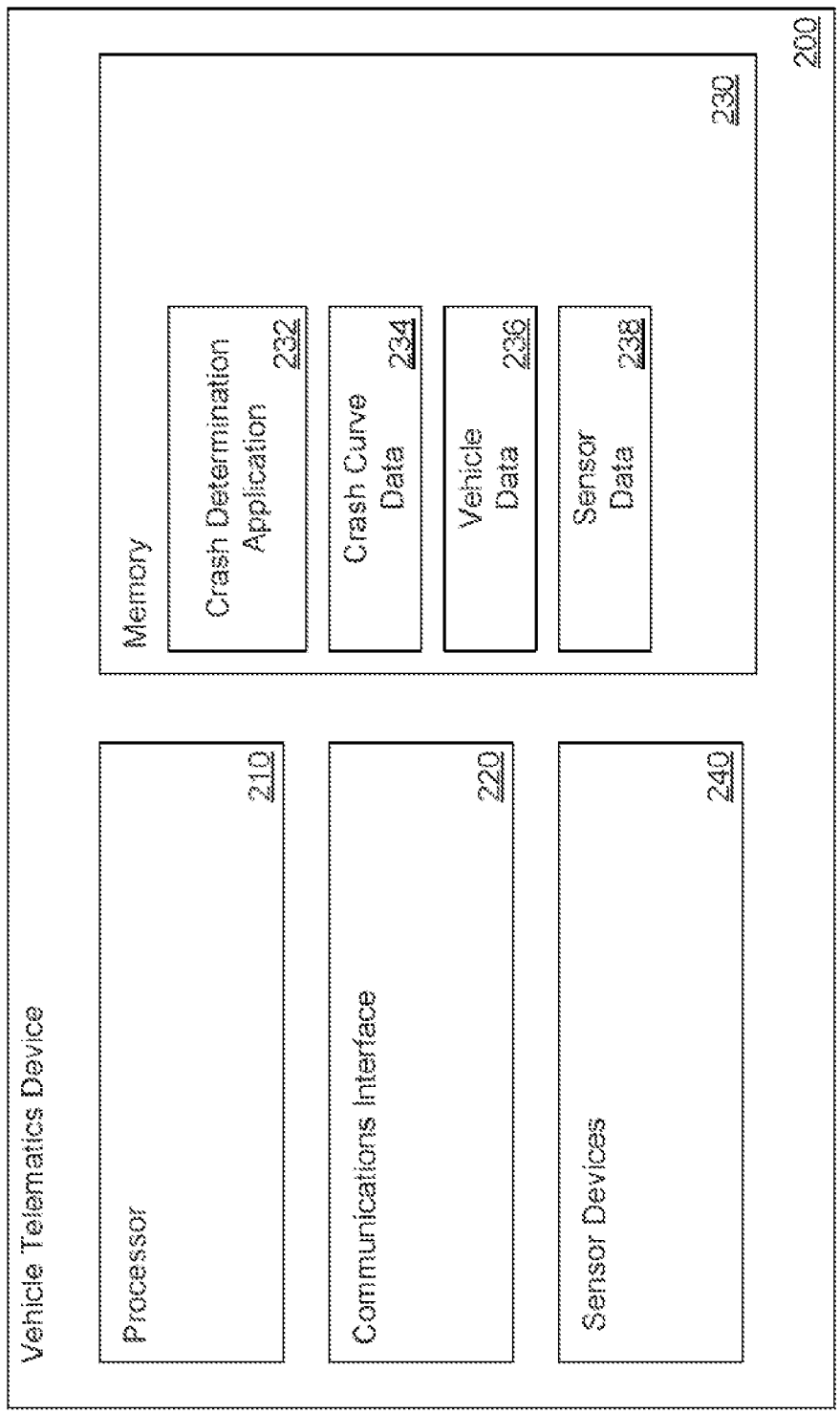
FIG. 2A is a conceptual illustration of a vehicle telematics device in accordance with an embodiment of the invention.

Vehicle telematics devices in accordance with embodiments of the invention can obtain data regarding the status of a vehicle and determine if the vehicle has been involved in a crash. A conceptual illustration of a vehicle telematics device in accordance with an embodiment of the invention is shown in FIG. 2A. The vehicle telematics device 200 includes a processor 210 in communication with memory 230. The vehicle status determination device 200 can also include one or more communication interfaces 220 capable of sending and receiving data. In a number of embodiments, the communication interface 220 is in communication with the processor 210, the memory 230, and/or the sensor device(s) 240. In several embodiments, the memory 230 is any form of storage configured to store a variety of data, including, but not limited to, a crash determination application 232, crash curve data 234, vehicle data 236, and sensor data 238. In many embodiments, the crash determination application 232, crash curve data 234, vehicle data 236, and/or sensor data 238 are stored using an external server system and received by the vehicle telematics device 200 using the communications interface 220. Sensor devices 240 can include RPM sensors, voltage sensors, GPS receivers, noise sensors, vibration sensors, acceleration sensors, weight sensors, and any other device capable of measuring data regarding a vehicle as appropriate to the requirements of specific applications of embodiments of the invention. Sensor devices 240 can be included within the vehicle telematics device 200 and/or located external to the vehicle telematics device 200. The vehicle telematics 200 can communicate with external sensor devices using the communications interface 220, such as via a vehicle data bus, I/O interface, and/or a network connection as appropriate to the requirements of specific applications of embodiments of the invention.

Figure 2B:
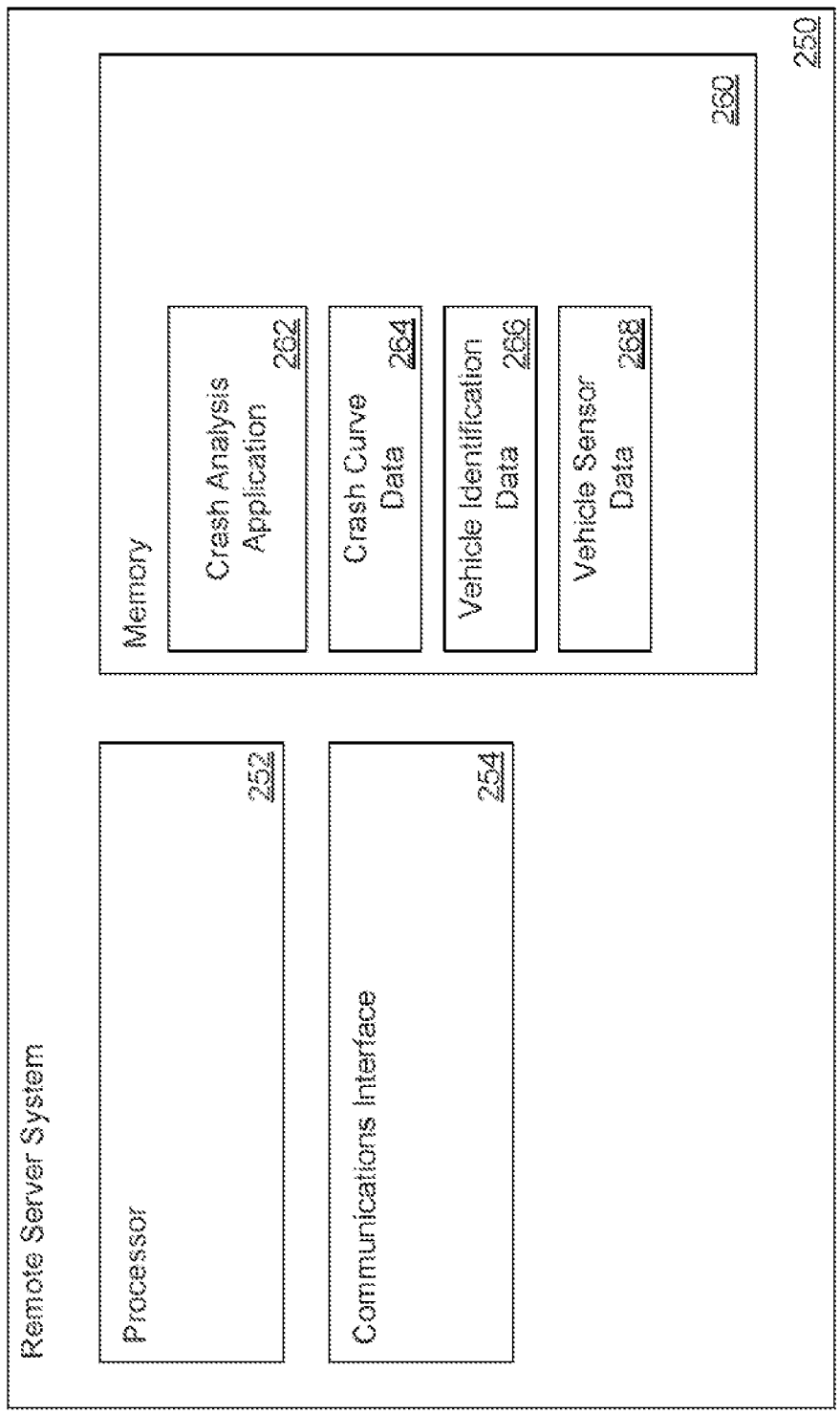
FIG. 2B is a conceptual illustration of a remote server system in accordance with an embodiment of the invention.

Remote server systems in accordance with embodiments of the invention can obtain data regarding the status of a vehicle and determine if the vehicle has been involved in a crash. A conceptual illustration of a remote server system in accordance with an embodiment of the invention is shown in FIG. 2B. The remote server system 250 includes a processor 252 in communication with memory 260. The remote server system 250 can also include one or more communication interfaces 254 capable of sending and receiving data. In a number of embodiments, the communication interface 254 is in communication with the processor 252 and/or the memory 260. In several embodiments, the memory 260 is any form of storage configured to store a variety of data, including, but not limited to, a crash analysis application 262, crash curve data 264, vehicle identification data 266, and vehicle sensor data 268. In many embodiments, the crash analysis application 262, crash curve data 264, vehicle identification data 266, and/or vehicle sensor data 268 are stored using an external server system and received by the remote server system 250 using the communications interface 254.

The processor 210 and processor 252 can be directed, by the vehicle telematics application 232 and the crash analysis application 262 respectively, to perform a variety of crash determination processes. Crash determination processes can include obtaining data from a variety of sensor devices, determining data regarding the state of the vehicle, and using the vehicle data and/or crash curve data to determine if the vehicle has been involved in a crash. A number of crash determination processes that can be performed in accordance with embodiments of the invention are described in more detail below.

Although specific architectures for vehicle telematics devices and remote server systems in accordance with embodiments of the invention are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Crash Detection

As described above, crash determination processes can include determining if a vehicle has been involved in a crash. In several embodiments, the crash determination processes include determining an appropriate threshold value and/or crash curve to be utilized in the crash determination process. Once a threshold value and/or crash curve has been determined for the vehicle, a variety of sensor data can be utilized to calculate crash score data describing the likelihood that the vehicle has been involved in a crash. In a variety of embodiments, the crash score data is calculated by determining if and/or how long the peak resultant of the acceleration of the vehicle exceeds a threshold value as described in more detail below. If the crash score data is indicative of a potential crash, the sensor data and/or vehicle identification data can be provided to a remote server system for a second stage analysis, also described in more detail below.

In a number of embodiments, the threshold value is pre-determined and/or determined dynamically. In a variety of embodiments, the threshold value is a crash curve defining a variable threshold value based on the characteristics of the vehicle and/or the measured sensor data. The characteristics of the vehicle can be described using vehicle identification data including any of a vehicle identification number, the weight of the vehicle, the length of the vehicle, the width of the vehicle, the wheelbase of the vehicle, the height of the vehicle, weight map data describing the distribution of weight throughout the vehicle, location data, and any other data as appropriate to the requirements of specific applications of embodiments of the invention. The threshold value can be determined using a vehicle telematics device and/or obtained from a remote server system as appropriate to the requirements of specific embodiments of the invention.

In a variety of embodiments, the threshold value is based on the location in which the telematics unit and/or the sensor devices are installed in the vehicle. In many embodiments, the threshold value is based on the weight of the vehicle. In those embodiments where a threshold value and/or a crash curve has not been defined for a specific vehicle, the characteristics of the vehicle can be utilized to dynamically generate and/or select a threshold value and/or crash curve that is appropriate to the specific vehicle. By way of example, the weight, height, length, and wheelbase of the vehicle can be utilized to determine a class of vehicle (i.e. small/medium/large and/or sedan/coupe/SUV/tractor/trailer) and a threshold value and/or crash curve can be selected based on previously measured events for other vehicles having a similar weight, height, length, and wheelbase. In several embodiments, several threshold values and/or crash curves can be combined to generate an appropriate threshold value and/or crash curve for the specific vehicle.

In many embodiments, the distribution of weight throughout the vehicle is utilized to determine the appropriate threshold value and/or crash curve. A weight map describing the distribution of weight can be generated based on the standard weight for the vehicle (e.g. the weight of the vehicle as provided by the manufacturer) modified by the removal and/or addition of elements to the vehicle. These modifications can include, but are not limited to, the weight of the occupants of the vehicle, the weight of any equipment added to the vehicle, the weight of any equipment removed from the vehicle, and any cargo carried in the vehicle. In several embodiments, the vehicle telematics system installed in the vehicle communicates with one or more weight sensors installed throughout the vehicle to obtain the weight of the vehicle at one or more locations within the vehicle. These weight sensors can be installed anywhere as appropriate to the requirements of specific embodiments of the invention, including in the seats of the vehicle, the trunk of the vehicle, and near the wheels and/or suspension of the vehicle. The vehicle telematics unit can communicate with the weight sensors in any manner as appropriate to the requirements of specific applications of embodiments of the invention, including via wired and/or wireless communication interfaces and onboard diagnostic systems. The weight map can include a scalar value indicating the total weight of the car and/or subdivide the vehicle to two or more regions and describe the weight in each of the regions. For example, the car can be divided into a front half and a back half, into quarters (drivers front, drivers rear, passenger front, passenger rear), into thirds (hood, passenger compartment, trunk), or any other set of regions as appropriate to the requirements of specific applications of embodiments of the invention.

Figure 3:
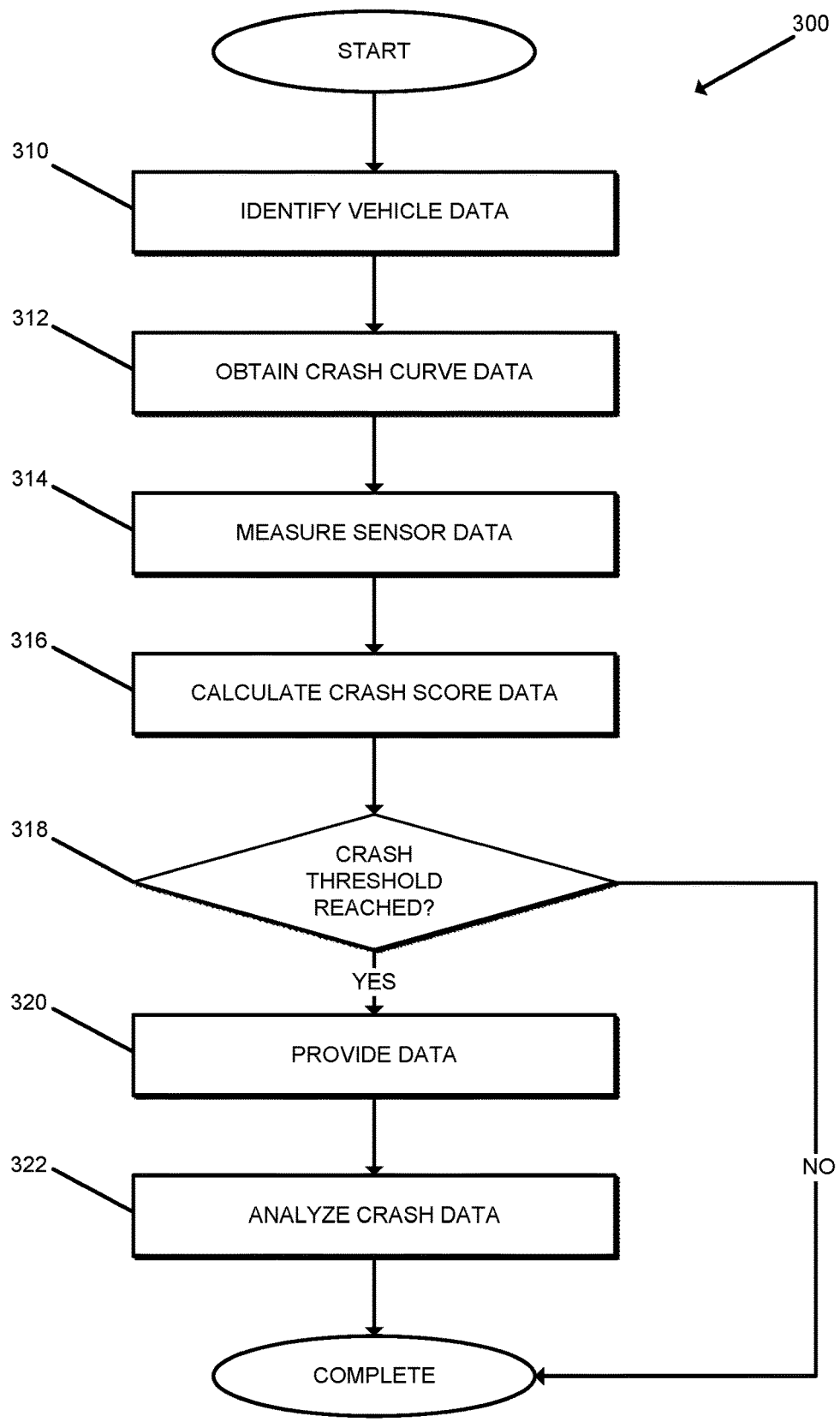
FIG. 3 is a flow chart illustrating a process for determining the occurrence of a crash event in accordance with an embodiment of the invention.

Turning now to FIG. 3, a process for crash detection and analysis in accordance with an embodiment of the invention is shown. The process 300 can include identifying (310) vehicle data and obtaining (312) crash curve data. Sensor data is measured (314) and crash score data is calculated (316). When a crash threshold is reached (318), data can be provided (320) and analyzed (322).

Specific processes for detecting crashes in accordance with embodiments of the invention are described above and shown with respect to FIG. 3; however, any number of processes, including those that utilize different combinations of data than the examples described above, can be utilized as appropriate to the requirements of a specific application in accordance with embodiments of the invention. Techniques for local and remote crash analysis in accordance with embodiments of the invention are described in more detail below.

Local Crash Analysis

A variety of crash determination processes include performing a first stage analysis to determine if a vehicle has been involved in a crash. In several embodiments, the first stage analysis is performed using a vehicle telematics device installed in a vehicle. In many embodiments, the first stage analysis includes calculating peak resultant data from acceleration data obtained using acceleration sensors and comparing the peak resultant data to a crash curve for the vehicle. As described above, a variety of sensors can be utilized to obtain the sensor data utilized to perform the crash determination processes. In many embodiments, the sensors include an accelerometer capable of measuring acceleration data along a forward (x) vector and a lateral (y) vector. However, it should be noted that any number of sensors, including multiple single-vector accelerometers oriented along varying vectors, can be utilized to obtain the sensor data as appropriate to the requirements of specific applications of embodiments of the invention. The acceleration data can be utilized to calculate the peak resultant of the acceleration signals for the duration of the potential crash event. In several embodiments, the peak resultant is measured as a weight unit per mass of the vehicle along a particular vector. In a number of embodiments, the peak resultant (PeakR(xy)) for acceleration data measured in a forward (x) and lateral (y) vector can be calculated using the following equation:

$$\text{Peak}R(xy) = \sqrt{X\text{acceleration}^2 + Y\text{acceleration}^2}$$

where Xacceleration is the measured acceleration along the forward vector and Yacceleration is the measured acceleration along the lateral vector.

In the event that the peak resultant exceeds a threshold value for one or more of the measured axes then a crash event can be indicated. In several embodiments, a number of acceleration samples over a period of time are used to calculate the peak resultant over the time period. When the peak resultant exceeds the threshold value for the time period a potential crash event is indicated. The threshold value can be a pre-determined value, determined dynamically based on the characteristics of the vehicle, and/or a crash curve as described above. The crash curve for the vehicle can be pre-determined and/or determined dynamically based on the characteristics of the vehicle as appropriate to the requirements of specific applications of embodiments of the invention. In several embodiments, the crash curve data is obtained from a remote server system based on the vehicle identification data provided by a vehicle telematics unit.

If the first stage analysis determines that a crash may have occurred, the vehicle sensor data and data identifying the vehicle can be utilized to perform a second stage analysis, described in more detail below. This second stage analysis can be performed using the vehicle telematics unit and/or the data can be provided to a remote server system for processing as appropriate to the requirements of specific applications of embodiments of the invention.

Figure 4:
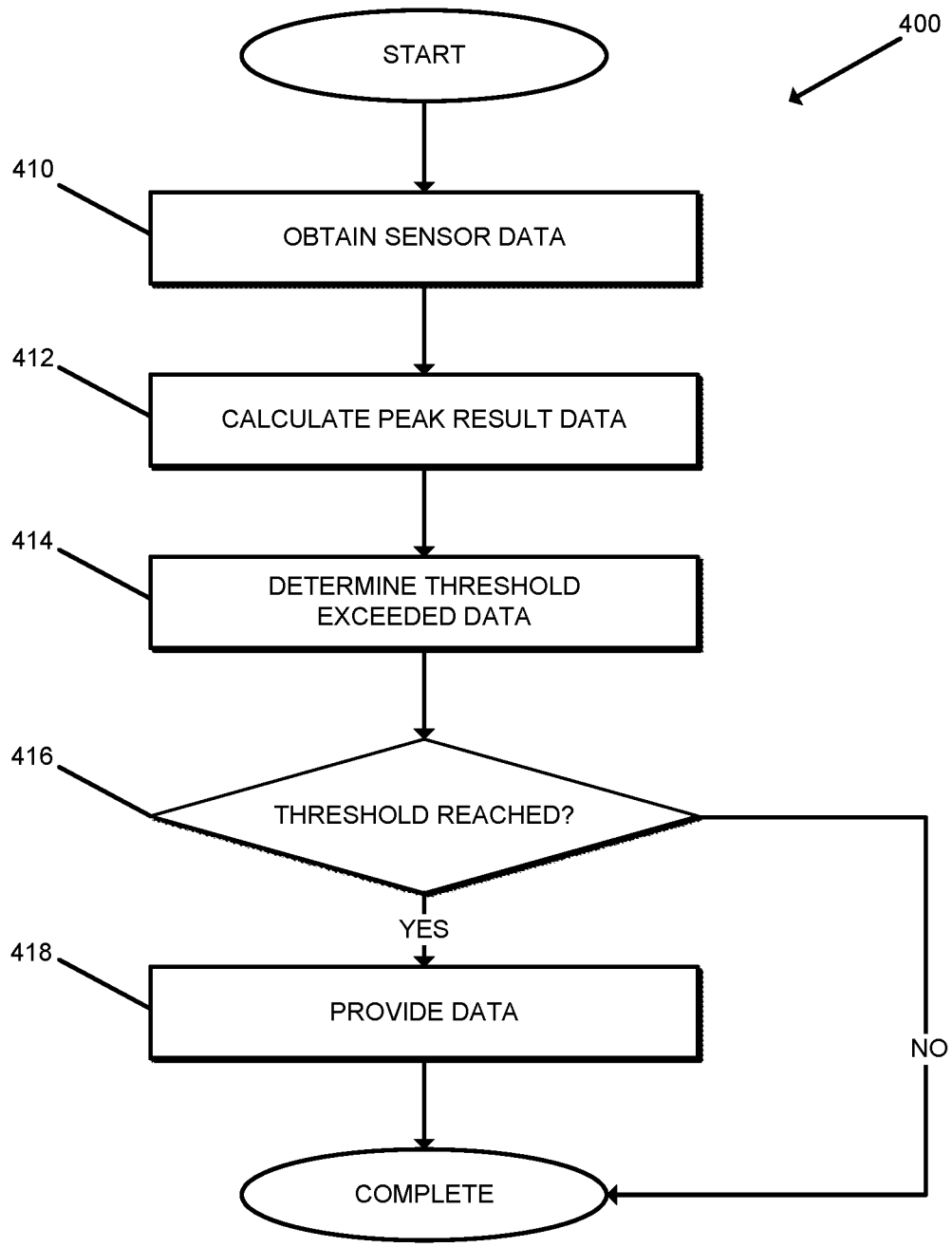
FIG. 4 is a flow chart illustrating a process for a local crash analysis in accordance with an embodiment of the invention.

Turning now to FIG. 4, a process for local crash analysis in accordance with an embodiment of the invention is shown. The process 400 includes obtaining (410) sensor data, calculating (412) peak resultant data, and determining (414) threshold exceeded data. When a threshold is reached (416), data can be provided (418) to any of a variety of systems, including remote server systems as appropriate to the requirements of specific applications of embodiments of the invention.

Although specific processes for local crash analysis in accordance with embodiments of the invention are described above and shown with respect to FIG. 4, any number of processes, including those that use alternative criteria for determining if a crash has potentially occurred or accumulate sensor data using any of a variety of data recordation techniques, can be utilized as appropriate to the requirements of a specific application in accordance with embodiments of the invention.

Remote Crash Analysis

In many embodiments, crash determination processes include performing a second stage analysis to determine if a vehicle has been involved in a crash. In a number of embodiments, the second stage analysis is performed by a remote server system having the time and/or computing resources exceeding those present in a vehicle telematics device, thereby allowing more complex analyses to be performed. Vehicle sensor data can be obtained and utilized to calculate the resultant change in velocity for the vehicle. The vehicle sensor data can include acceleration data along one or more axes. In several embodiments, the sensor data can include acceleration information in both a forward (x) and lateral (y) vector. The acceleration data can be processed to calculate the resultant change in velocity along one or more vectors in accordance with embodiments of the invention. By way of example, the resultant change in velocity along a forward (x) and lateral (y) vector (RESdvXY(xy)) can be calculated by:

$$RESdvXY(xy) = \sqrt{fXacceleration^2 + fYacceleration^2}$$

where Xacceleration is the measured acceleration along the forward vector and Yacceleration is the measured acceleration along the lateral vector.

\The result change in velocity can be compared to the threshold data to determine if a crash has occurred. By way of example, if the resultant change in velocity is less than a threshold value then the event can be considered a non-crash, if the value is equal to or greater than a threshold value then it is considered a crash. Additionally, the characteristics of the vehicle can be provided as vehicle identification data and utilized in the crash analysis. In several embodiments, the vehicle identification data is used to select crash curve data for the specific vehicle identified from a set of crash curve data for a variety of vehicles. In a variety of embodiments, crash curve data is dynamically generated for the specific vehicle based on the vehicle identification data. In a number of embodiments, the weight of the vehicle can be utilized to determine the threshold value to determine if a crash event has occurred. Returning to the previous example, the weight of the vehicle could be utilized to recalculate the threshold value from the threshold described above. The threshold value can be any value in any units (such as meters per second or feet per second) as appropriate to the requirements of specific applications of embodiments of the invention.

In many embodiments, notification data can be generated when a crash has occurred. The notification data can be used to alert third party systems about a crash, solicit emergency services, and/or be provided to any of a variety of third-party systems as appropriate to the requirements of specific applications of embodiments of the invention. It should be noted that previously received data can be stored and utilized to refine the crash determination processes, including improving the determination of the threshold values based on the vehicle identification data and the calculation of the resultant change based on the vehicle sensor data.

Figure 5:
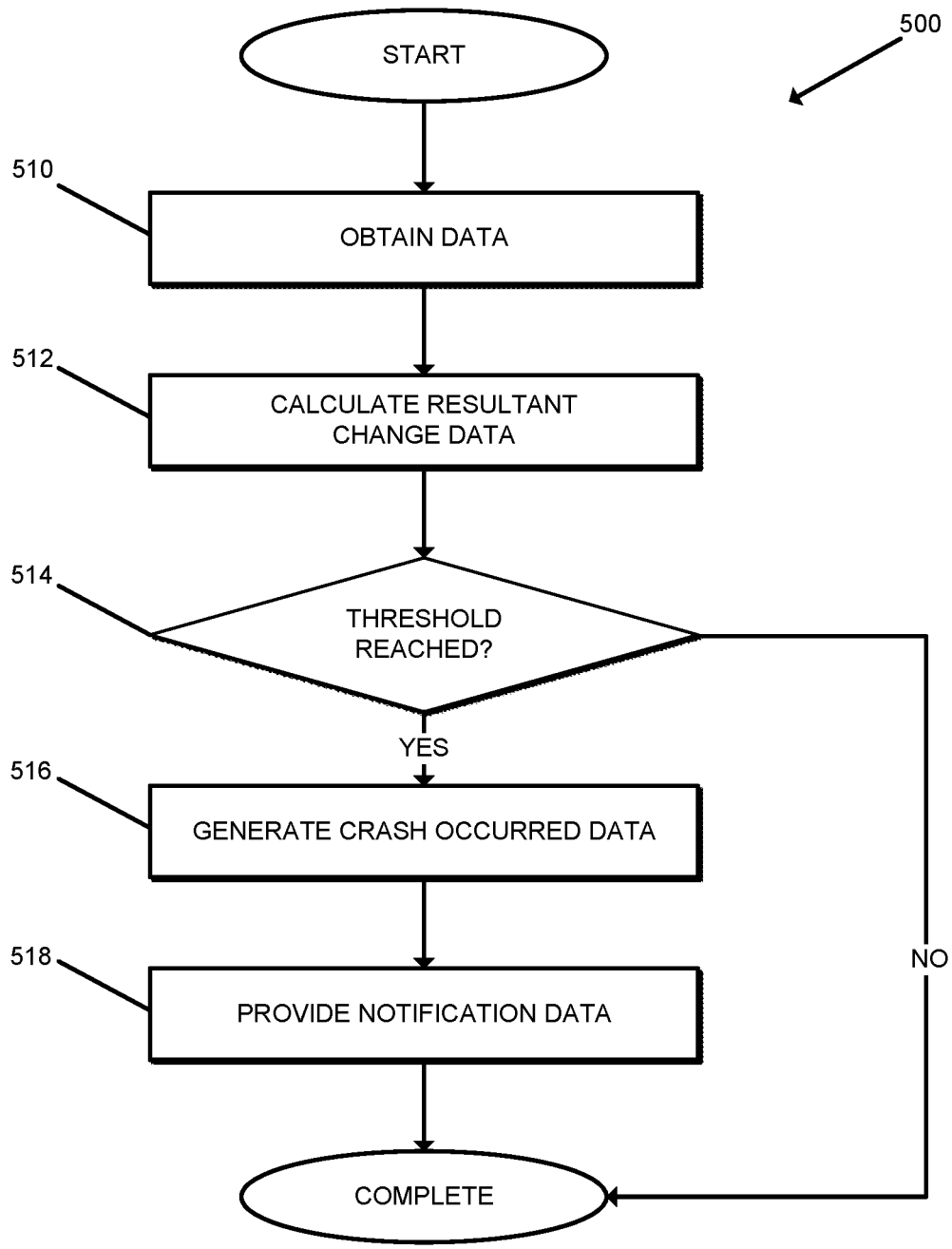
FIG. 5 is a flow chart illustrating a process for a remote crash analysis in accordance with an embodiment of the invention.

Turning now to FIG. 5, a process for remote crash analysis in accordance with an embodiment of the invention is shown. The process 500 includes obtaining (510) data and calculating (512) resultant change data. When a threshold is reached (514), crash occurred data can be generated (516) and, in a number of embodiments, notification data can be provided (518).

Specific processes for remote crash analysis in accordance with embodiments of the invention are described above and shown with respect to FIG. 5; however, any number of processes, including those that provide alternative notifications to indicate a crash has occurred, can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

The invention claimed is:

1. A system for crash determination, the system comprising:
   a remote server; and
   a vehicle telematics device configured to be installed into a vehicle and comprising an accelerometer, a first processor, and a first memory connected to the first processor, wherein the first memory includes a plurality of instructions that, when executed by the first processor, cause the vehicle telematics device to:
   obtain sensor data from the accelerometer,
   perform a first stage analysis comprising calculation of peak resultant data based on the sensor data, wherein the peak resultant data is indicative of an acceleration of the vehicle over a first time period,
   generate crash score data based on the peak resultant data and a set of crash curve data for the vehicle, wherein the crash score data is indicative of the likelihood that the vehicle was involved in a crash based on a class of the vehicle and the sensor data, and
   transmit, to the remote server and in response to a determination that the crash score data exceeds a first threshold, the sensor data and the vehicle identification data that identifies the vehicle,
   wherein the remote server comprises a second processor and a second memory, wherein the second memory includes a plurality of instructions that, when executed by the second processor, cause the remote server to:
   receive, from the vehicle telematics device, the sensor data and the vehicle identification data,
   perform a second stage analysis comprising calculation of resultant change data based on the sensor data and the vehicle identification data, wherein the resultant change data describes a resultant change in velocity for the vehicle; and
   generate, in response to a determination that the resultant change data exceeds a second threshold, crash occurred data indicative that a crash of the vehicle has occurred.

2. The system of claim 1, wherein to perform the first stage analysis comprises to calculate a peak resultant acceleration in a forward vector and a lateral vector relative to the vehicle.

3. The system of claim 2, wherein to calculate the peak resultant acceleration comprises to calculate the peak resultant acceleration according the following equation:

$$\text{Peak}R(xy) = \sqrt{X\text{acceleration}^2 + Y\text{acceleration}^2}$$

wherein PeakR(xy) is the peak resultant acceleration, Xacceleration is a measured acceleration in a forward vector relative to the vehicle, and Yacceleration is a measured acceleration in a lateral vector relative to the vehicle.

4. The system of claim 1, wherein the plurality of instructions of the first memory, when executed by the first processor of the vehicle telematics device, further cause the vehicle telematics device to transmit the vehicle identification data to the remote server prior to generation of the crash score data, and
   wherein the plurality of instructions of in the second memory, when executed by the second processor of the remote server, further cause the remote server to transmit, in response to receipt of the vehicle identification data, the crash curve data to the vehicle telematics device.

5. The system of claim 1, wherein the plurality of instructions of the first memory, when executed by the first processor of the vehicle telematics device, further cause the vehicle telematics device to dynamically determine the crash curve data based on a class of the vehicle.

6. The system of claim 1, wherein the first threshold is based on a location of the vehicle telematics device in the vehicle.

7. The system of claim 1, wherein to generate the crash score data comprises to calculate the crash score data based on a duration of time in which the peak resultant data exceeds the crash curve data.

8. The system of claim 1, wherein to perform the second stage analysis comprises to calculate a resultant change in velocity in a forward vector and a lateral vector relative to the vehicle.

9. The system of claim 8, wherein to calculate the resultant change in velocity comprises to calculate the resultant change in velocity according the following equation:

$$\text{RES}dvXY(xy) = \sqrt{\int X\text{acceleration}^2 + \int Y\text{acceleration}^2}$$

wherein RESdvXY(xy) is the resultant change in velocity, Xacceleration is a measured acceleration in a forward vector relative to the vehicle, and Yacceleration is a measured acceleration in a lateral vector relative to the vehicle.

10. The system of claim 1, wherein the class of the vehicle is based on at least one of: a height of the vehicle, a length of the vehicle, or a wheelbase of the vehicle.

11. A method for crash determination, the method comprising:
    obtaining, by a vehicle telematics device, sensor data from an accelerometer associated with a vehicle;
    performing, by the vehicle telematics device, a first stage analysis comprising calculating peak resultant data based on the sensor data, wherein the peak resultant data is indicative of an acceleration of the vehicle over a first time period;
    generating, by the vehicle telematics device, crash score data based on the peak resultant data and a set of crash curve data for the vehicle, wherein the crash score data is indicative of the likelihood that the vehicle was involved in a crash based on a class of the vehicle and the sensor data;
    transmitting, to a remote server and in response to a determination that the crash score data exceeds a first threshold, the sensor data and vehicle identification data that identifies the vehicle;
    receiving, by the remote server and from the vehicle telematics device, the sensor data and the vehicle identification data,
    performing, by the remote server, a second stage analysis comprising calculating resultant change data based on the sensor data and the vehicle identification data, wherein the resultant change data describes a resultant change in velocity for the vehicle; and
    generating, by the remote server and in response to a determination that the resultant change data exceeds a second threshold, crash occurred data indicative that a crash of the vehicle has occurred.

12. The method of claim 11, wherein performing the first stage analysis comprises calculating a peak resultant acceleration in a forward vector and a lateral vector relative to the vehicle.

13. The method of claim 12, wherein calculating the peak resultant acceleration comprises calculating the peak resultant acceleration according the following equation:

$$\text{Peak}R(xy) = \sqrt{X\text{acceleration}^2 + Y\text{acceleration}^2}$$

wherein PeakR(xy) is the peak resultant acceleration, Xacceleration is a measured acceleration in a forward vector relative to the vehicle, and Yacceleration is a measured acceleration in a lateral vector relative to the vehicle.

14. The method of claim 11, further comprising:
transmitting, by the vehicle telematics device, the vehicle identification data to the remote server prior to generation of the crash score data; and
transmitting, by the remote server and in response to receipt of the vehicle identification data, the crash curve data to the vehicle telematics device.

15. The method of claim 11, further comprising dynamically determining, by the vehicle telematics device, the crash curve data based on a class of the vehicle.

16. The method of claim 11, wherein the first threshold is based on a location of the vehicle telematics device in the vehicle.

17. The method of claim 11, wherein generating the crash score data comprises calculating the crash score data based on a duration of time in which the peak resultant data exceeds the crash curve data.

18. The method of claim 11, wherein performing the second stage analysis comprises calculating a resultant change in velocity in a forward vector and a lateral vector relative to the vehicle.

19. The method of claim 18, wherein calculating the resultant change in velocity comprises calculating the resultant change in velocity according the following equation:

$$RESdvXY(xy) = \sqrt{\int Xacceleration^2 + \int Yacceleration^2}$$

wherein RESdvXY(xy) is the resultant change in velocity, Xacceleration is a measured acceleration in a forward vector relative to the vehicle, and Yacceleration is a measured acceleration in a lateral vector relative to the vehicle.

20. The method of claim 11, wherein the class of the vehicle is based on at least one of: a height of the vehicle, a length of the vehicle, or a wheelbase of the vehicle.

* * * * *